March 21, 1967 C. C. FAUST ETAL 3,309,837
METHOD AND APPARATUS FOR PRODUCING A PACKAGE
Filed Oct. 21, 1964 3 Sheets-Sheet 2

INVENTORS
CLIFFORD C. FAUST
ALVIN E. ERICSON
BY
ATTORNEY

March 21, 1967 C. C. FAUST ETAL 3,309,837
METHOD AND APPARATUS FOR PRODUCING A PACKAGE
Filed Oct. 21, 1964 3 Sheets-Sheet 3

INVENTORS
CLIFFORD C. FAUST
ALVIN E. ERICSON
BY John F. Hohmann
ATTORNEY

United States Patent Office 3,309,837
Patented Mar. 21, 1967

3,309,837
METHOD AND APPARATUS FOR
PRODUCING A PACKAGE
Clifford C. Faust, La Grange, and Alvin E. Ericson, Chicago, Ill., assignors to Union Carbide Corporation, a corporation of New York
Filed Oct. 21, 1964, Ser. No. 405,438
7 Claims. (Cl. 53—39)

This invention relates to method and apparatus for producing a plastic comprising an article completely encased in an elastic thermoplastic film under tension.

It is an object of this invention to provide an improved method for producing a package having a heat sealed closure.

It is a further object of this invention to provide an improved method for producing a package comprising an article completely encased in an elastic thermoplastic film under tension.

It is a further object of this invention to provide an improved method which comprises a series of steps that can be carried out safely and efficiently to produce a heat sealed package having excellent consumer appeal.

It is a further object of this invention to provide improved apparatus for producing a package having a heat sealed closure.

It is still a further object of this invention to provide improved apparatus that can be operated by a single operator safely and efficiently to produce a package comprising an article completely encased in an elastic thermoplastic film under tension.

Other objects of this invention will be evident from the ensuing description taken in conjunction with the drawings wherein.

Broadly, the method of this invention for producing a package comprising an article completely encased in an elastic thermoplastic film under tension comprises the steps of pre-aligning an article in an open-mouth bag of elastic thermoplastic film at a first station, the bag having a length greater than that required to encase the article; straightening and/or narrowing the mouth of the bag, moving the article in the bag to a second station, applying tension to the open-mouth end of the bag to tension the bag about the article, applying a transverse clamping force to the mouth of the bag while under tension in an area immediately adjacent to the article, concomitantly relaxing the tension on the bag mouth while heat sealing the bag in a transverse region coextensive with the clamping area, reapplying the tension to the bag mouth to sever the bag at the proximal side of the heat seal and removing the excess portion of the bag, cooling the sealed region while maintaining the clamping force, releasing the clamping force, and removing the finished package from the second station by the force of gravity.

Apparatus suitable for carrying out the instant method broadly comprises clamping means forming vertically disposed generally parallel arms such as a horizontally disposed U-shaped member, heat sealing means mounted on the inside of one arm of the U-shaped member, reciprocative means mounted on the inside of the other arm of the U-shaped member adapted to cooperate with the heat sealing means in a clamping operation, and an elongated plate adjacent the lower arm of the U-shaped member and having a first station adjacent the open end of the U-shaped member adapted to prealign an article in an open mouth bag of elastic thermoplastic film and to straighten and narrow the mouth of the bag for lateral insertion in the U-shaped member and a second station adapted to receive the article in the bag upon insertion of the narrowed mouth of the bag for support during clamping and sealing. The elongated plate is disposed at an angle below the horizontal such that a finished package will slide thereoff under the force of gravity. The heat sealing means and the reciprocative means are adapted to accommodate the narrowed mouth of the bag therebetween and to constrain the bag encased article at the second station when tension is applied to the open mouth end of the bag. In addition, means are provided to advance and retract the reciprocative means in a clamping operation with the heat sealing means, and to activate the heat sealing means during the clamping operation.

Figure 1:
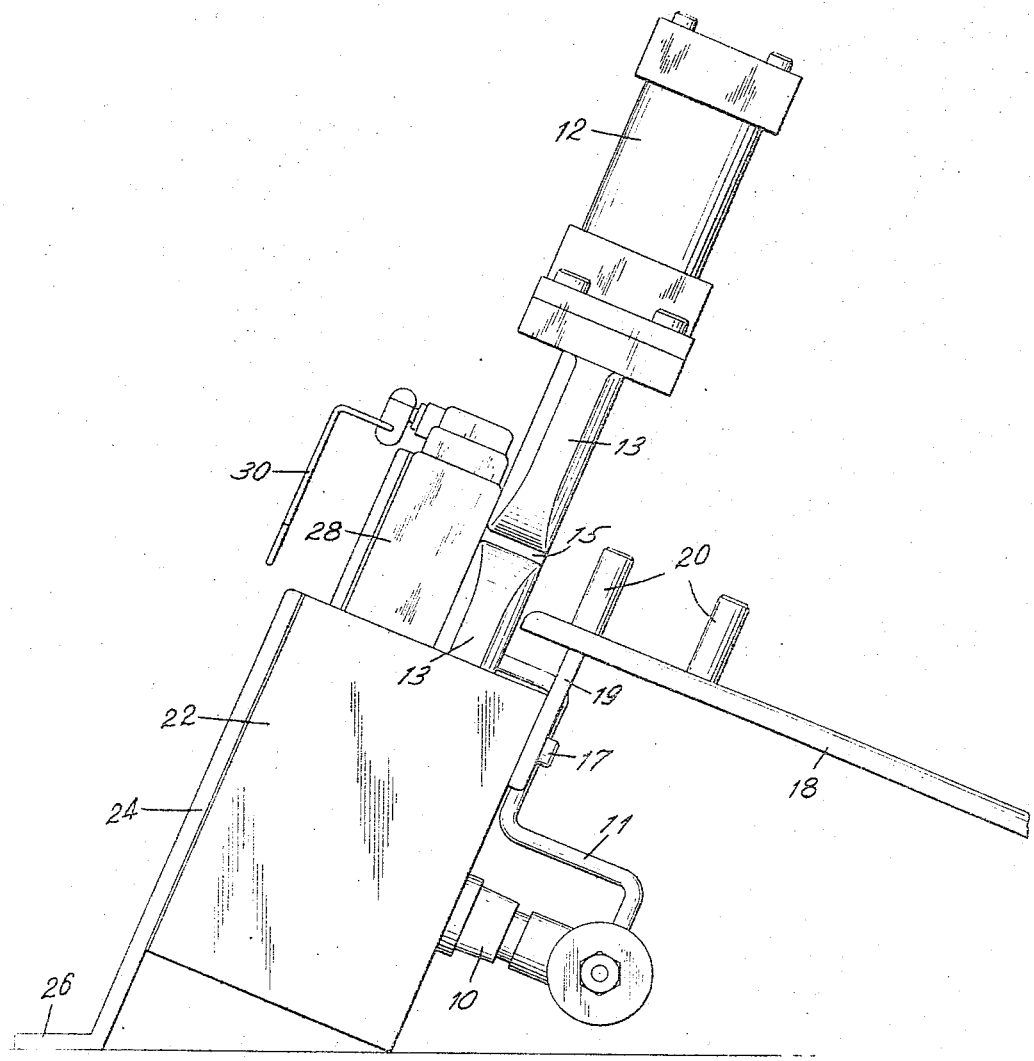
FIGURE 1 is an end view in elevation of preferred apparatus of this invention suitable for carrying out the method of this invention.
Figure 2:
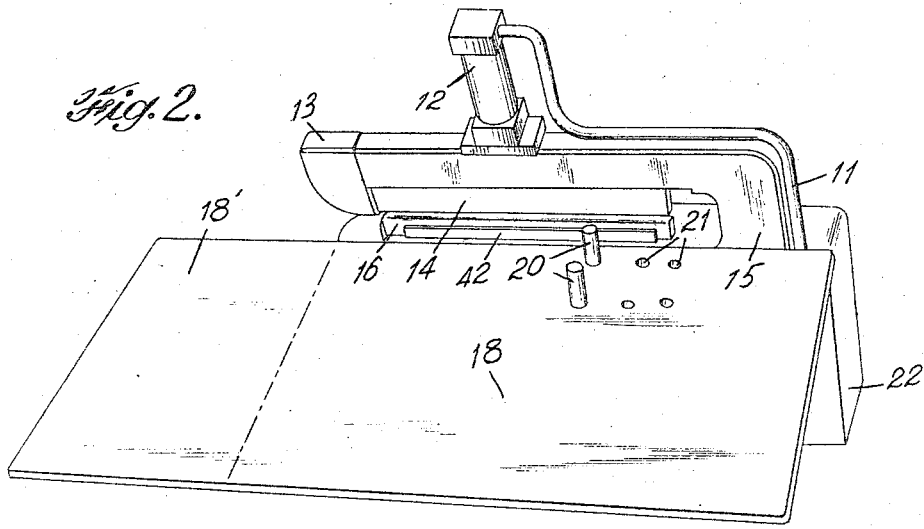
FIGURES 2 and 3 are perspective views of the preferred apparatus shown in FIGURE 1.
Figure 3:
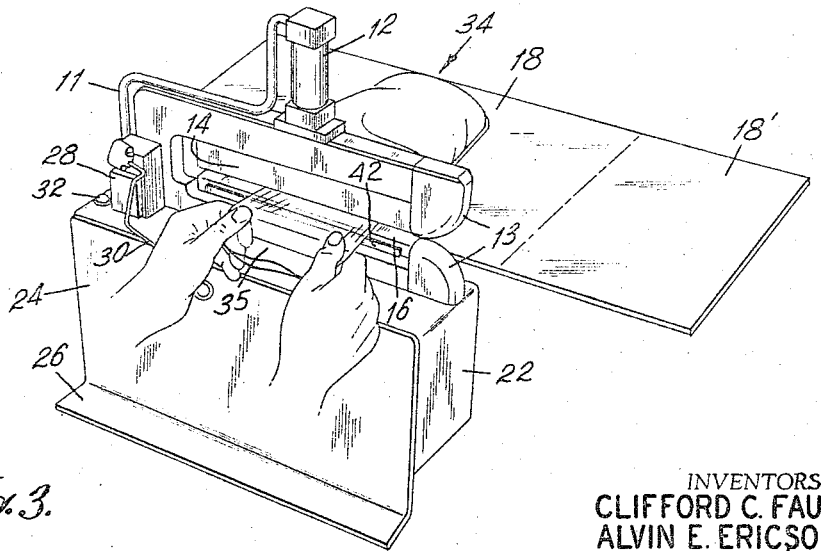

Referring now to the drawings, and particularly to FIGURES 1–3, the preferred apparatus of this invention is shown to include a suitable housing 22 on top of which is mounted a horizontally disposed U-shaped member 15 having vertically disposed generally parallel arms. The housing 22 contains electrical components for operating the apparatus which are described in detail below. On the inside of the lower arm of the U-shaped member 15 are mounted heat sealing means 16 and on the inside of the upper arm are mounted reciprocative means 14. The means 14 and 16 are described in more detail below. The U-shaped member 15 is also provided with two end caps 13 shaped to facilitate insertion of the flattened mouth of a bag between the means 14 and 16.

Adjacent the lower arm of the U-shaped member 15 is an elongated plate 18 one end of which extends beyond and is adjacent to the open end of the U-shaped member 15. This end of the plate is the area bounded by a dotted line and the edges oft he plate 18 in FIGURES 2 and 3, and is indicated by the reference numeral 18′. This end 18′ of the plate 18 is designated as a first station for prealignment of an article in an open mouth bag of elastic thermoplastic film and for straightening the mouth of the bag. The plate 18 is provided with stops 20, shown in FIGURES 1 and 2, for insuring proper alignment of an article in a bag with the heat sealing means 16. The stops 20 define a second station on the plate 18 for supporting an article in a bag during clamping and heat sealing. The plate 18 is also provided with additional holes 21 adapted to accommodate the stops in different positions to insure alignment of the bag encased article with the heat sealing means 16 depending on the width of a given bag.

As shown in FIGURE 1, the plate 18 is provided with an adjustable mounting bracket 19 which is secured to the housing 22 by a mounting nut 17. The height of the plate 18 with respect to the opening between the means 14 and 16 is regulated by means of the mounting bracket 19.

The housing 22 is provided with a covering plate 24 by means of which access to the interior thereof is gained. Dependent from the covering plate 24 is a foot 26 by means of which the entire assembly of the housing 22, the U-shaped member 15, and the plate 18 is disposed at an angle away from the vertical such that a finished sealed package will slide from the plate 18 under the force of gravity. An angle of 15° to 30° to the horizontal has been found desirable. This is more clearly shown in FIGURE 1.

Also shown in FIGURE 1 is an electric air valve 10 by means of which air under pressure is admitted to the line 11 to activate the air cylinder 12 which advances and retracts the reciprocative means 14 in a clamping operation with the heat sealing means 16. The operation of the valve 10 and the cylinder 12 is described in more detail below.

Figure 4:
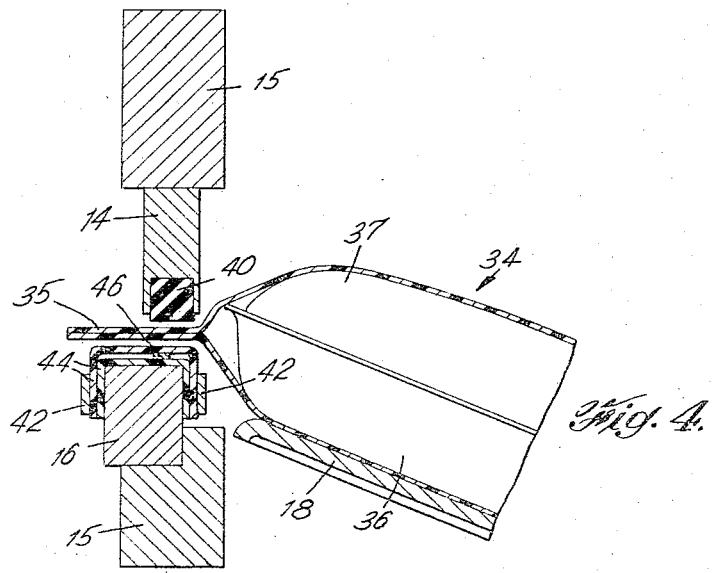
FIGURE 4 is a sectional view on an alternate embodiment of the preferred apparatus of FIGURES 1–3 showing a package in place just prior to clamping and heat sealing.
Figure 5:
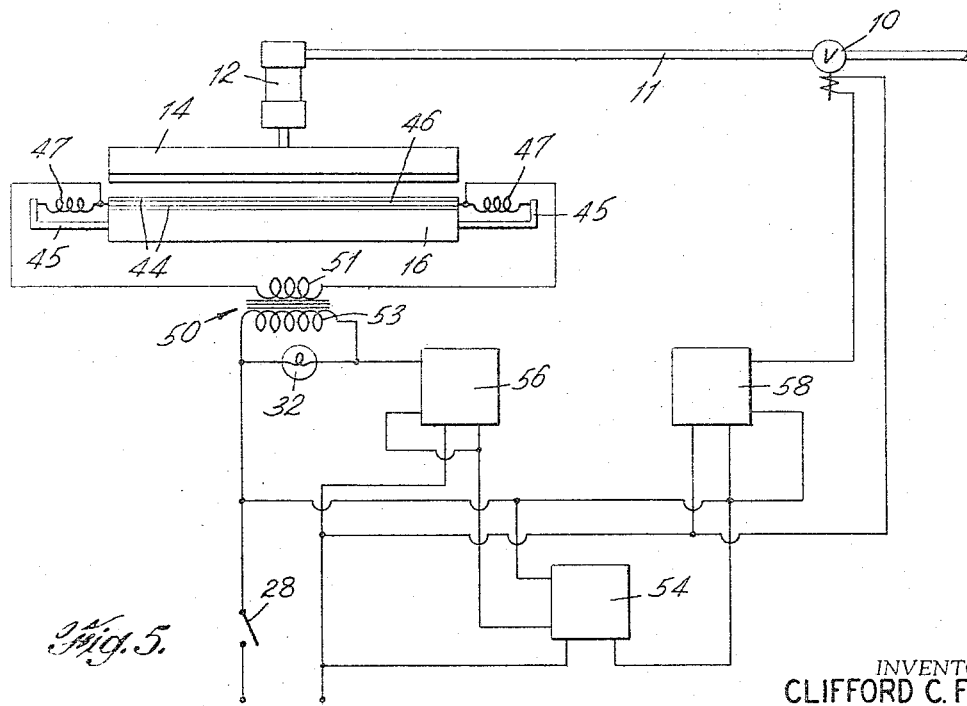
FIGURE 5 is a diagrammatic view of preferred apparatus of this invention.

Referring now to FIGURES 4 and 5, the heat sealing means 16, mounted on the inside of the lower arm of the U-shaped member 15, is shown to be provided with a Nichrome sealing ribbon 46 sandwiched between two layers of glass fiber cloth 44 impregnated with polytetrafluoroethylene and held in place by means of clamping bars 42. The clamping bars 42 are also shown in FIGURES 2 and 3. The Nichrome sealing ribbon 46 is kept under tension by means of springs 47, and brackets 45 fastened at each end of bar 16. Sealing ribbon 46 is electrically connected to the secondary winding 51 of a step-down transformer 50. This is shown in FIGURE 5. The reciprocative means 14, mounted on the inside of the upper arm of the U-shaped member 15, is shown to be provided with a resilient cushion bar 40.

FIGURE 4 also illustrates an alternate embodiment of the preferred apparatus shown in FIGURE 1. In FIGURE 4, the U-shaped member 15 is shown vertical while the plate 18 is sloped at an angle such as about 75° to the U-shaped member 15.

The operation of the apparatus shown in the drawings for producing a package will now be briefly described. An article placed in an open mouth bag of elastic thermoplastic film which is longer than the article is shown in FIGURES 2 and 4 and is indicated generally by the reference numeral 34. In FIGURE 4, the open mouth bag is indicated by the reference numeral 35 and the article, which has been placed in a pressed paper pulp tray 36, by the reference numeral 37. An operator initially grasps the bag 35 containing the article 37 by the open mouth thereof and swings the bag onto the plate 18 at the first station 18'. In swinging the bag 35, the film walls thereof are pulled taut about the article 37. At the first station 18' the article 37 in the bag 35 is prealigned with the U-shaped member 15, and the mouth of the bag 35 is straightened and narrowed by the operator for lateral insertion into the U-shaped member 15. The operator then slides the article 37 in the bag 35 to the second station on the plate 18 by laterally inserting the narrowed open mouth of the bag 35, using the end caps 13 as guide means, between the reciprocative means 14 and the sealing means 16 mounted on the inside of the arms of the U-shaped member 15 over against the stops 20. Still grasping the bag 35 at the open mouth, the operator applies tension to the bag 35 in a longitudinal direction to tension the bag about the article 37 in the tray 36, against the sides of the open arms 14, 16 of U-shaped member 15. This step in the operation is shown in FIGURE 3. The plate 18 is set by means of the bracket 19 at a height so as to insure maximum ease for inserting the narrowed mouth of the bag 35 between the reciprocative means 14 and the heat sealing means 16. Also, the entire apparatus is tilted by the foot 26, as shown in FIGURE 1, or the plate 18 is sloped downwardly, as shown in FIGURE 4, to facilitate aligning the bag encased article into the sealing apparatus and to permit the finished package to be discharged therefrom by gravity.

While the operator has the mouth of the bag 35 under tension as is shown in FIGURE 3, he engages the switch lever 30 of a trip switch 28 with the palm of his left hand without releasing his grip on the bag 35. Concomitantly as the bag mouth is clamped the operator relaxes the tension on the bag mouth. Referring now to FIGURE 5, when the operator trips the switch 28, he sets in motion a series of timed operations. Trip switch 28 energizes the normally closed timers 54 and 58, and thereby allows timer 58 initially to complete the electrical circuit to open solenoid operated air valve 10. When the air valve 10 is opened, compressed air from a source (not shown) is admitted to the line 11 which activates the air cylinder 12 which in turn advances the reciprocative means 14 towards the heat sealing means 16. At this point, a transverse clamping force is applied by the means 14 and 16 to the flattened mouth of the bag 35 while it is under tension in an area immediately adjacent the article 37. The timer 54 operates after a delay of a finite period of time, generally about 0.2 second, to complete the electrical circuit to a normally closed timer 56 which in turn supplies current to the primary winding 53 of the step-down transformer 50 for a preset finite period of time, generally about 0.5 second. During this finite period of time, the secondary winding 51 of the transformer 50 supplies current to the Nichrome sealing ribbon 46 which acts to heat seal the bag 35 in a region coextensive with the aforementioned clamping area. A pilot light 32 signals during the interval when sealing current is supplied to the sealing ribbon 46. The timer 58 is preset to open the circuit to the air valve 10 a finite period of time after completion of the heat sealing operation, generally about 1.3 seconds. In other words, the clamping force is maintained for a finite period of time after completion of the heat sealing operation which allows the heat sealed region to cool before releasing the clamping force. When the air valve 10 is opened, air cylinder 12 is exhausted and suitable spring means associated with the cylinder 12 act to retract the reciprocative means 14.

In a preferred embodiment, the slope and position of the plate 18 is predetermined to provide a heat seal on the bag 35 that is positioned off center and below the lip of the tray 36 supporting the article 37. This is illustrated in FIGURE 4. This embodiment permits the heat seal to be somewhat concealed and provides for a more attractive finished package 34. As soon as the pilot light 32 indicates that the heat sealing operation is complete, the operator reapplies tension to the mouth of bag 35 thereby severing the surplus film at the proximal edge of the heat sealing ribbon before the clamping force is released. When the reciprocative means 14 are retracted, the finished sealed package slides off the plate 18 under the force of gravity and onto a conveyor or similar apparatus.

The heat sealing operation described above is known as the thermal impulse process of heat sealing. By this process the narrowed mouth of the bag 35 is clamped between the reciprocative means 14 and the heat sealing means 16. While being clamped, the plies of the bag 35 are heated to their welding temperature by a short, powerful electrical impulse which is sent through the sealing ribbon 46 which is a metal strip of very low heat capacity. The clamping force is maintained for a period of time after the impulse to allow the weld or heat seal to cool under pressure and to develop its full strength.

As stated above, the apparatus shown in the drawings constitutes the preferred apparatus of this invention. As will be evident to those skilled in the art, many modifications and changes can be made in the apparatus of the present invention without departing from the spirit and scope thereof. For example, the plate 18 can be sloped across the housing 22 so that the first station 18' will be higher than the second station at stops 20. This arrangement aids the operator in sliding an article in a bag from the first to the second station. In addition, the upper surface of plate 18 can be coated with a slip agent to facilitate sliding an article in a bag thereover.

The present invention is suitable for packaging all types of articles but is especially useful for packaging tray-packed cut-up poultry, frankfurters, a plurality of like food items, and unitary food items such as sausage chunks and the like.

Suitable elastic thermoplastic films for fabricating bags to be used in the present invention include plasticized polyvinyl chloride film; synthetic rubber films; polyolefin films such as polyethylene and polypropylene, and the like. The preferred elastic thermoplastic film is plasticized polyvinyl chloride. Suitable bags that can be used in the present invention include unitary, one-piece bags, a single sheet folded and sealed or glued to form a bag, or a plurality of sheets folded and sealed to form a bag. Bags may also bear printed matter to indicate the contents thereof and advertising matter to attract the consumer.

We claim:
1. A method for producing a package comprising an article completely encased in an elastic thermoplastic film under tension which comprises (a) prealigning said article in an open-mouth bag of elastic thermoplastic film at a first station, said bag having a length greater than that required to encase said article, (b) straightening the mouth of said bag at said first station, (c) moving said article in said bag to a second station, (d) applying tension to the open-mouth end of said bag in a longitudinal direction so as to tension said bag about said article, (e) applying a transverse clamping force to the mouth of said bag while under tension in an area immediately adjacent said article, (f) relaxing the tension on the open-mouth end of said bag while maintaining said clamping force, (g) heat sealing said bag in a transverse region coextensive with said clamping area, (h) reapplying tension to the open-mouth end of said bag at the termination of said heat sealing while maintaining said clamping force to sever the excess portion of said bag along the edge of said region furthest from said article, (i) cooling said sealed region while maintaining said clamping force, (j) releasing said clamping force, and (k) removing said package from said second station by the force of gravity.

2. Method for producing a package comprising an article completely encased in an elastic thermoplastic film under tension which comprises (a) placing an open-mouth bag of elastic thermoplastic film containing said article to be sealed therein at a downwardly inclined sealing station, said bag having a length greater than that required to encase said article, (b) applying tension to said open-mouth end in said bag's longitudinal direction using at least the force of gravity, (c) applying a transverse clamping force to the mouth of said bag while under tension in an area immediately adjacent said article, (d) relaxing the tension on the open-mouth end of said bag while maintaining said clamping force, (e) heat sealing said bag in a transverse region coextensive with said clamping area, (f) reapplying tension to the open-mouth end of said bag at the termination of said heat sealing while maintaining said clamping force to sever the excess portion of said bag along the edge of said region furthest from said article, (g) cooling said sealed region while maintaining said clamping force, (h) releasing said clamping force, and (i) removing said package from said sealing station by the force of gravity.

3. The method of claim 1 wherein said transverse clamping force is applied in an area offset to the center of said article.

4. Apparatus for producing a package comprising an article completely encased in an elastic thermoplastic film under tension which comprises (a) means forming a horizontally disposed U-shaped member having vertically disposed, generally parallel arms; (b) heat sealing means mounted on the inside of one arm of said U-shaped member; (c) reciprocative means mounted on the inside of the other arm of said U-shaped member adapted to cooperate with said heat sealing means in a clamping operation (d) means forming an elongated plate adjacent the lower arm of said U-shaped member and having
  (1) a first station adjacent the open end of said U-shaped member adapted to prealign an article in an open-mouth bag of elastic thermoplastic film and to straighten the mouth of said bag for lateral insertion in said U-shaped member, and
  (2) a second station adapted to receive said article in said bag upon insertion of the straightened mouth of said bag for support during clamping and sealing;
(e) said elongated plate being disposed at an angle below the horizontal such to facilitate entry of said article into said U-shaped member and that said package will slide thereoff under the force of gravity; (f) said heat sealing means and said reciprocative means adapted to accommodate the straightened mouth of said bag therebetween and to retain said article in said bag at said second station when tension is applied to the open mouth end of said bag; (g) means to advance and retract said reciprocative means in a clamping operation with said heat sealing means; (h) and means to activate said heat sealing means to heat seal said bag during said clamping operation.

5. The apparatus of claim 4 wherein said elongated plate and said U-shaped member are at right angles to each other and wherein the assembly of said plate and said U-shaped member is disposed at an angle away from the vertical such that said package will slide off said plate under the force of gravity.

6. The apparatus of claim 4 which includes electrical switch means adapted to energize a first timer adapted to complete an electrical circuit to activate said means for advancing and retracting said reciprocative means, and a second timer adapted to complete an electrical circuit to activate said heat sealing means, said second timer being further adapted to delay the activation of said heat sealing means for a finite period of time after the activation of said means for advancing and retracting and to deactivate said heat sealing means a finite period of time before the deactivation of said means for advancing and retracting by said first timer.

7. Apparatus for producing a package comprising an article completely encased in an elastic thermoplastic film under tension which comprises (a) vertically disposed, generally parallel arms forming clamping means, said means having at least one end open for the introduction of said encased film, said arms being spaced apart a distance less than the height of said article; (b) heat sealing means mounted on the inside of one arm of said clamping means; (c) reciprocative means mounted on the inside of the other arm of said clamping means and adapted to cooperate with said heat sealing means in a clamping and heat sealing operation; (d) means forming an elongated plate adjacent the lower arm of said clamping means for support during clamping and sealing of said article in an open mouth bag upon insertion of the straightened mouth of said bag between the clamping means; (e) said elongated plate being disposed at an angle below the horizontal such to facilitate entry of said article into said clamping means and that said package will slide thereoff under the force of gravity; (f) said heat sealing means and said reciprocative means adapted to accommodate the straightened mouth of said bag therebetween and to retain said article in said bag when tension is applied to the open mouth of said bag; (g) means to advance and retract said reciprocative means in a clamping operation with said heat sealing means; (h) and means to activate said heat sealing means to heat seal said bag during said clamping operation.

References Cited by the Examiner
UNITED STATES PATENTS

| | | | |
|---|---|---|---|
| 2,914,898 | 12/1959 | Rumsey | 53—372 X |
| 3,011,295 | 12/1961 | Brugger | 53—372 X |

TRAVIS S. McGEHEE, *Primary Examiner.*